US010742638B1

(12) United States Patent
Fischer et al.

(10) Patent No.: US 10,742,638 B1
(45) Date of Patent: Aug. 11, 2020

(54) STATELESS PRINCIPAL AUTHENTICATION AND AUTHORIZATION IN A DISTRIBUTED NETWORK

(71) Applicant: EMC IP Holding Company LLC, Hopkinton, MA (US)

(72) Inventors: Ilia Fischer, Milton (CA); Aliaksandr Shtop, Oakville (CA); Michael Roche, Hamilton (CA)

(73) Assignee: EMC IP Holding Company LLC, Hopkinton, MA (US)

( * ) Notice: Subject to any disclaimer, the term of this patent is extended or adjusted under 35 U.S.C. 154(b) by 450 days.

(21) Appl. No.: 15/499,599

(22) Filed: Apr. 27, 2017

(51) Int. Cl.
*G06F 21/00* (2013.01)
*H04L 29/06* (2006.01)

(52) U.S. Cl.
CPC ........ *H04L 63/083* (2013.01); *H04L 63/0428* (2013.01); *H04L 63/101* (2013.01)

(58) Field of Classification Search
CPC .. H04L 63/083; H04L 63/101; H04L 63/0428
See application file for complete search history.

(56) References Cited

U.S. PATENT DOCUMENTS

| | | | | |
|---|---|---|---|---|
| 2010/0198730 | A1* | 8/2010 | Ahmed | G06F 21/6209 705/50 |
| 2011/0307947 | A1* | 12/2011 | Kariv | H04L 63/08 726/9 |
| 2013/0191884 | A1* | 7/2013 | Leicher | H04L 63/08 726/4 |
| 2015/0150109 | A1* | 5/2015 | Bocanegra | H04L 63/0807 726/9 |
| 2017/0141926 | A1* | 5/2017 | Xu | H04L 9/3247 |

\* cited by examiner

*Primary Examiner* — Kendall Dolly
(74) *Attorney, Agent, or Firm* — Staniford Tomita LLP

(57) ABSTRACT

Embodiments are directed to a method and system for performing stateless authentication and authorization in a distributed computer network, by receiving, in an authentication and authorization service (AAS) component, a user request to network clients from a client user for data access served by an application, wherein the request comprises user credentials; providing the user credentials to an identity authenticator; performing, in the AAS component, client authorization for the user validated by the identity authenticator; encapsulating a token with the client authorization; and transmitting the token to an application service that services the user request to return results based on the client authorization.

20 Claims, 8 Drawing Sheets

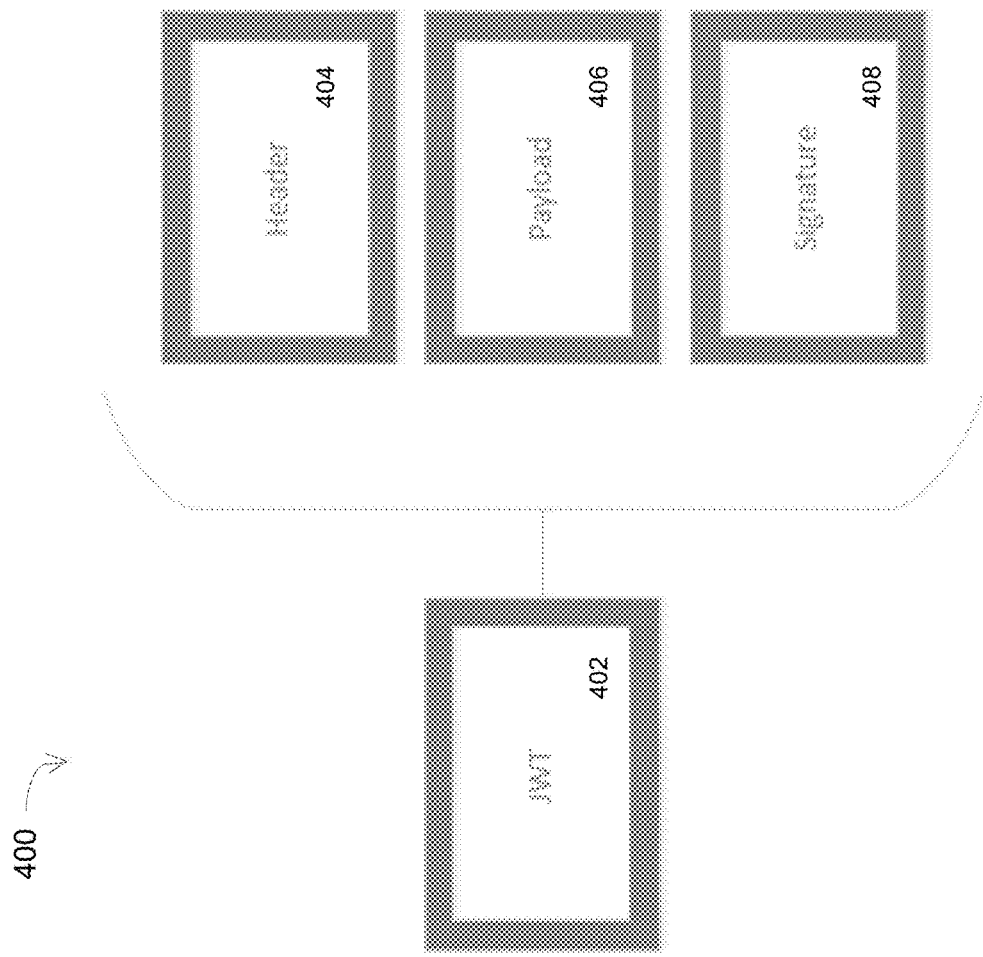

| Keyword | Explanation |
|---|---|
| typ | token type |
| alg | type of signature |
| x5t | particular public key that was used to sign to token |

| Keyword | Type | Explanation |
|---|---|---|
| aud | registered | the recipients that the JWT is intended for |
| exp | registered | the expiration time on after which the JWT MUST NOT be accepted for processing |
| first_name | private | the first (or "given") name of the user |
| iat | registered | the time at which the JWT was issued |
| iss | registered | the principal that issued the JWT |
| last_name | private | the last (or "family") name of the user |
| nbf | registered | the time before which the JWT NOT be accepted for processing |
| roles | private | roles that the subject has been granted both directly and indirectly through group membership and can be used to enforce RBAC |
| sub | registered | the principal that is the subject of the JWT |
| tid | private | directory tenant that issued the JWT |
| ver | private | payload version |

STATELESS PRINCIPAL AUTHENTICATION AND AUTHORIZATION IN A DISTRIBUTED NETWORK

TECHNICAL FIELD

Embodiments are generally directed to distributed network security, and more specifically to a stateless authentication and authorization service for users.

BACKGROUND

Distributed network systems spread the processor resources and data across multiple computers in the network. Cloud computing technology has been developed to provide shared computer processing resources (e.g., network links, servers, storage, applications, etc.) and data to computers and other devices on demand. Cloud computing and storage solutions provide users and enterprises with various capabilities to store and process their data in either privately owned, or third-party data centers to serve high numbers of client computer users. Multitenancy has become an important feature of cloud computing. In multi-tenant network environments, a single instance of an application runs on a server and serves multiple tenants. Multi-tenant systems provide every tenant a dedicated share of the software instance, including its data, configuration, user management, tenant-specific functionality, and other properties.

With large-scale distributed network environments in which many users or tenants share common resources stored in often virtual storage locations, it is absolutely vital to maintain data integrity and strict controlled access among the tenant to their own data and services. An authentication and authorization (AA) service is a multi-tenant component used to authenticate and authorize principals' access to data of various software components designated to serve multiple tenants. It enables logical separation between tenants' data within a single software component. This is key in a multi-tenant architecture in which a single instance of a software application serves multiple tenants to ensure that no tenant has unauthorized access to another tenant data. The AA Service may use the concept of "roles" and "tenants" to encapsulate these data access privileges through role based access control (RBAC). In general, RBAC is a policy-neutral access control mechanism that is defined around roles and privileges of personnel or departments within a company or organization. RBAC uses role permissions and user/role relationships to assign and enforce network access privileges within the organization.

Existing authentication mechanisms issue principals (requesters) a token, which is usually a meaningless hash value, on each successful authentication attempt. The token verification requires interaction with the server which has issued the token. This solution is not robust enough for distributed systems of software components since it generates performance bottlenecks and has single point of failure. What is needed, therefore, is a token verification system that is robust enough for distributed network environments and that minimizes bottlenecks and failure points.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 4 illustrates a representation of the token data structure under the JSON Web Token (JWT) convention according to some embodiments.

FIG. 5A is a table that lists the minimal contents of a JWT header under an embodiment.

FIG. 5B is a table that lists the minimal contents of a JWT payload under an embodiment.

DETAILED DESCRIPTION

Figure 1:
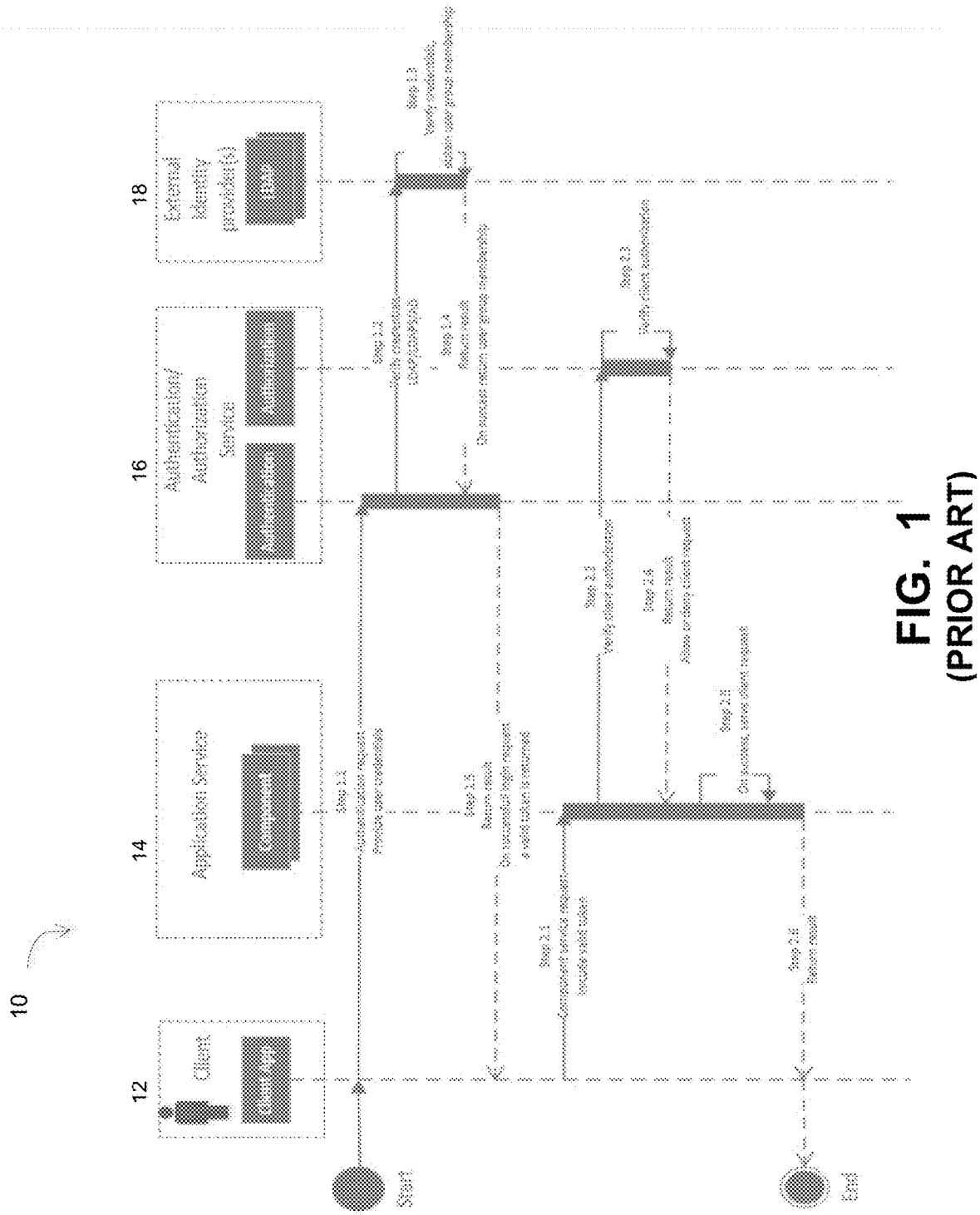
FIG. 1 illustrates a token-based authentication and authorization system as is currently known, and that is not fully stateless.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve a stateless authentication and authorization in multi-tenant networks based a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Figure 2:
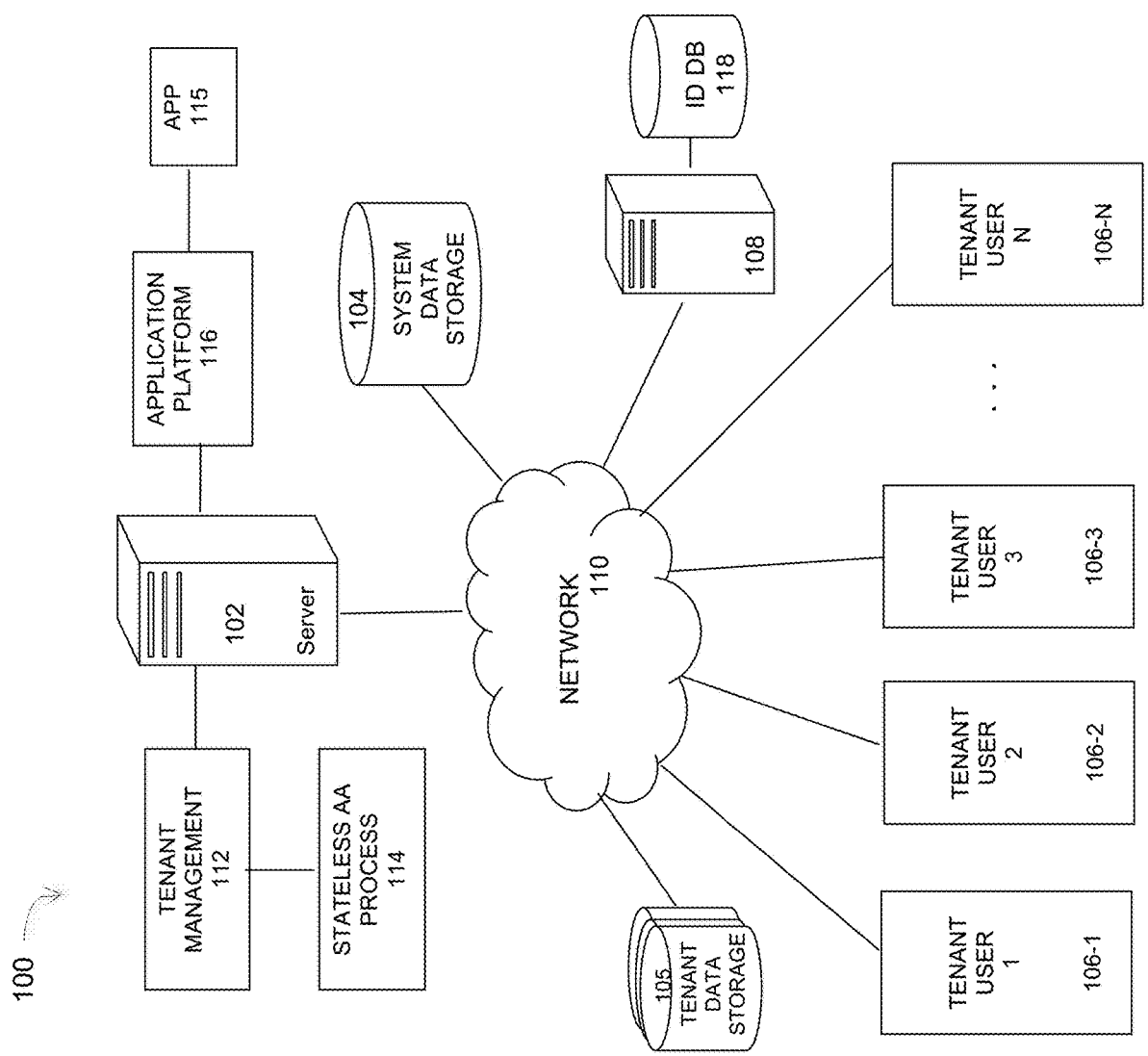
FIG. 2 illustrates a multi-tenant network system that implements some embodiments of a stateless authentication and authorization token system.

FIG. 2 illustrates a distributed network environment 100 that includes a multi-tenant network system that implements one or more embodiments of a stateless authentication and authorization system. System 100 represents a network environment in which on-demand applications hosted by a server 102 through an application platform 116 may be used by a number N of tenants 106-1 to 106-N. In an embodiment, system 100 may implement virtualization technology in the multi-tenant network in which the server 102 runs a single instance of an application program that is designed to virtually partition its data so that each client works with its own customized virtual application, with each virtual machine (VM) representing virtual clients that may be supported by one or more servers within each VM, or other type of centralized network server.

A typical example application 115 is a shared database in which each tenant 106 is a database user and has access to various parts of the data within the database. In this case server 102 is a database server that simultaneously processes requests for the N tenant users in response to queries or other access requests by the users. Such data storage may be any appropriate networked accessed storage devices 114. The data sourced by the data source may be any appropriate data, such as database data that is part of a database management system. In this case, the data may reside on one or more hard drives (or similar storage devices) and may be stored in the database in a variety of formats (e.g., XML or RDMS). The database server may instantiate a program that interacts with the database. Each instance of a database server may, among other features, independently query the database and store information in the database, or it may be an application server that provides user interfaces to database servers, such as through web-based interface applications or through virtual database server or a virtual directory server applications. Embodiments are not so limited, however, and any appropriate application or applications 115 may be hosted by server 102 and managed through application platform 116.

In the multi-tenant environment 100, the application 115 is an on-demand application in which the application data and/or its processes is made available to the users when the users need the application, and that is provided in a manner that does not require each user to build or maintain their own local version of the application. The application platform 116 enables the creation, management, and execution of applications developed by the server 102 administrator or other developers. The server may utilize system data storage 104, while the tenant users may have respective tenant data storage 105.

The network server computer 102 is coupled directly or indirectly to the tenants (e.g., 106-1 to 106-N) any network clients and other servers through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP) as in hypertext transport protocols (HTTP), well known in the relevant arts. In a distributed network environment, network 110 may represent a cloud-based network environment in which applications, servers and data are maintained and provided through a centralized cloud computing platform.

Any number N of real or virtual machines may be used to implement the tenant platforms 106-1 to 106-N. Though referred to generally as "users," such machines may represent individual user operated machines, automated processes, hardware devices, and so on. The tenant users may have different capacities, roles, capabilities and privileges with respect to the data, applications, and other resources of network 100. These privileges may be determined by permissions, policies, or rules defined within the system. Thus, for the example of FIG. 2, tenant management system 112 includes policies that implement privileges and accesses for each of the tenants with respect to the applications and system data. In an embodiment in which network 100 represents a single or unitary organization network, server 102 may represent the system administrator server, while tenant management module 112 would contain personnel management processes or the like.

In an embodiment, tenant management module 112 includes an RBAC-based authentication and authorization (AA) service that governs the network access of the tenant users based on the roles of each tenant user. In this context, access is the ability of an individual user to perform a specific task, such as view, create, or modify a file, or access their own (and other) partitions within the tenant and/or system data. Roles are generally defined according to job competency, authority, and responsibility within the enterprise or network. The AA service thus uses the concept of roles and tenants to encapsulate data access privileges within system 100. The RBAC process needs to obtain the users' roles in a secure manner in order to properly enforce the access rules. In an embodiment, tokens are used to securely pass user information and details among the processing components of the system.

In general, token-based authentication is stateless in that the system does not store any information about a user on the server or in a session. Implementation of token use typically involves the following example process: (1) a user requests access with credentials (e.g., username and password); (2) the application validates the credentials; (3) the application provides a signed token to the client; (4) the client stores that token and sends it along with every request; and (5) the server verifies token and responds with data. In this process, tokens are stored on the client side and every single request requires a token, which are sent in the HTTP header. For the embodiment of FIG. 2 an external identity provider 108 provides certain credential information, such as stored in an identity (ID) database 118 for use by the tenant management 112 and stateless AA process 114. Elements of the AA server may be implemented in either a dedicated server 108 or as a process hosted by any other server in the network, such as server 102.

In general, present known AA systems are not entirely stateless in that they issue a token on each successful authentication event. The token verification step requires interaction with the server (e.g., 108) which has issued the token. FIG. 1 illustrates a token-based authentication and authorization system as is currently known and used, and that is not fully stateless. As shown in diagram 10 of FIG. 1, a client 12 initially connects to the authentication/authorization service (AAS) 16, denoted as step 1.1. The AAS performs tenant-based authentication using external identity provider (EIP) 18, as denoted by steps 1.2 to 1.4, and which is configured for each tenant. The same EIP could be configured for multiple tenants. The result of steps 1.1 to 1.4 is that a token is returned to the client 12, denoted as step 1.5. In this prior known solution of FIG. 1, the token does not include authorization information. As shown in steps 2.1 to 2.6 of FIG. 1, the client 12 requests a service from application service 14. The application service could be configured for each tenant or the same application service could serve several tenants. The application service 14 needs to make a decision whether or not to serve or deny the client request. It generally does this by applying and enforcing any applicable Role Based Access Control (RBAC) policies or other defined access restriction rules. The application server 14 verifies client request in steps 2.2 to 2.4 by querying the AAS 16. Upon successful authorization, the application service 14 serves the client request, denoted as step 2.5, and returns results to the client 12, denoted as step 2.6.

The prior known AA system of FIG. 1 has several significant drawbacks. First, the AAS 16 needs to have some "state" in order to process tokens, and therefore this system is not truly stateless; that is, the system 10 requires the session to retain session information about each client/server during the course of each request session as an internal state of the server. Second, each client request for a service requires access to the AAS 16. For systems with many requests, this path represents a bottleneck that can cause potentially significant delays in the AA process. In a distributed network with many multiple tenants or other similar clients, prior solutions are simply not robust or efficient enough to provide effective AA support.

In an embodiment, the AA system of FIG. 1 is replaced by an improved system to provide benefits that allow efficient and robust implementation of AA processes in large-scale distributed networks. This new system is advantageous in that no remote cross-components calls are necessary for the token verification and components' RBAC, and no state preservation in a particular centralized tokens' or sessions' management entity is necessary. Such a mechanism ensures robustness of the software components' system by preventing any single point of failure in the system thanks to absence of a particular centralized state management. It improves the overall performance, as all trusted software components can verify and authorize the principal's requests with the authorization token independently, without interaction with the authorization server. The new mechanism enables the use of multiple authorization server instances in the system as well. As a result, the system is scalable, fault tolerant and highly available through the software components' concurrency and redundancy.

Figure 3:
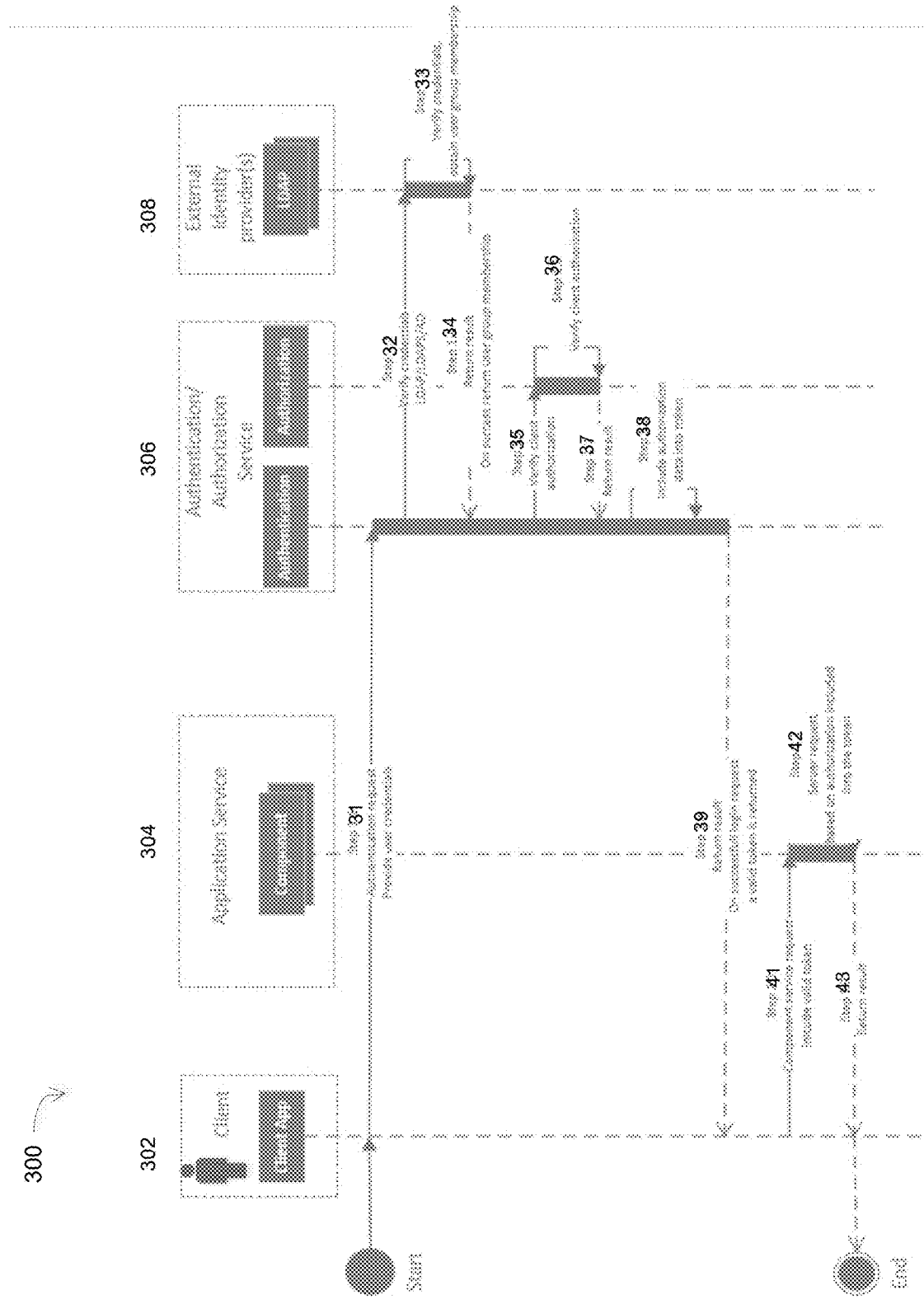
FIG. 3 illustrates a stateless token-based authentication and authorization system under some embodiments.

FIG. 3 illustrates a stateless token-based authentication and authorization service under some embodiments. In this embodiment, the stateless authentication and authorization system 300 is implemented using a token that includes the AA required information in a lightweight data structure to overcome the limitations of the prior known approaches, such as illustrated in FIG. 1. In certain implementations, JSON Web Tokens (JWT) are used as the token mechanism, though embodiments are not so limited. As shown in diagram 300, the client 302 initially connects to the authentication/authorization service (AAS) 306 as shown in step 31 and provides user credentials as part of the authentication request. The AAS 306 performs tenant-based authentication using an external identity provider (RIP) 308, as shown in steps 32 to 34. In this process, the AAS 306 verifies the credentials using a lightweight directory access protocol (LDAP) or similar mechanism (e.g., MAPS, AD, etc.) (32). The EIP 308 then verifies credentials and obtains the user group membership (33). The EIP 308 could be configured for each tenant separately, or for multiple tenants. After verification (33), the AAS 306 returns the result, which is the user group membership if verification is successful (34).

The AAS 306 next performs client authorization for each tenant, as shown in steps 35 to 37. In this process, the AAS first verifies client authorization during an authentication stage (35) and then verifies client authorization during an authorization phase (36), and then returns the result (37). The authorization results are encapsulated into a token, as shown in step 38. That authorization information will be used by the application service 304 when enforcing Role Based Access Control (MAC). The resulting token is returned to the client 302 as shown in step 39.

After the token is returned to the client 302, the client requests a service from application service 304, as shown in steps 41 to 43. In this process, the service request from the client includes the valid token (41). The application service then processes the request based on the authorization included in the token (42), and returns the result to the user (43). The application service can be individually configured for each tenant or the same application service could serve several tenants. The application service 304 uses the provided token to make a decision whether to serve or deny the client request through the application and enforcement of RBAC rules and policies. The solution shown in FIG. 3 has several benefits over the present system of FIG. 1. Primarily, the token includes all the required information to make authentication and authorization decisions at the application server side, which makes the AAS and application server component stateless. Furthermore, as compared with FIG. 1, it can be seen that the process of FIG. 3 eliminates the need for the service request from the client application to access the AAS (as required steps 2.1 to 2.4 in FIG. 1), and thus removes this potential communications bottleneck. The stateless and streamlined solution of FIG. 3 thus helps to improve the system performance and scalability when serving many client requests.

In an embodiment, the token is a lightweight token that is supplied for all the service requests. To enable the stateless mechanism, such a token should not require any sessions in the system, and must therefore be lightweight, such as compared to SAML (Security Assertion Markup Language) tokens, which can be large in size and verbosity (e.g., based on XML syntax). In an embodiment, the token used in system 100 and process 300 is a JSON web token (JWT), which is a lightweight token that uses the JSON (JavaScript Object Notation) syntax. Any other similar lightweight token may be used, however, as long as it does not impose significant syntax or require sessions that may implicate the system state.

In an embodiment, the token's data is signed and encrypted, so that it is meaningless to a third party who may get access to the token. This prevents exposure of any information about the principal's roles and the different tenants, and renders the system safe from man-in-the-middle (MIM) or other similar attacks. The token's signature prevents unauthorized modification of its data. The token's serialization, signature and encryption are implemented using the JWT protocol, which provides a compact URL-safe means of representing claims which are transferred between two parties in a distributed system. The claims in a MT are encoded as a JSON object that is used as the payload of a JSON web signature structure or as the plaintext of a JSON web encryption structure. As is known, JSON is a lightweight data-interchange format that is built on two structures including a collection of name/value pairs (object, record, structure, etc.) and an order list of values (array, list, sequence, etc.). In an embodiment, the JWT token using JSON conforms to the open standard RFC 7519. Embodiments are not so limited, however, and other similar token formats can be used.

Under the convention, a logical representation of the JWT token data structure under some embodiments is illustrated in FIG. 4. A shown in diagram 400, the JWT 402 is composed of a header 404, a payload 406, and a signature 408. Typically, a JWT is simply just a string with the following format, separated with a period character ".":
Header.Payload.Signature The header 404 is a JSON object and it contains the metadata for the token. FIG. 5A is a table 500 that lists the minimal contents of a MT header under an embodiment. As shown in table 500, the header comprises at least the token type (typ), type of signature (alg), and the particular public key that was used to sign the token (x5t).

An example header can be expressed as follows:
{
"typ": "JWT",
"alg": "RS256",
"x5t": "kriMPdmBvx68skT8-mPAB3BseeA"
}

The payload 406 is a JSON object that consists of claims. The payload (claims) contains any information that needs to be transferred between involved parties. There are three classes of JWT claim names:

(1) registered claim names: e.g., names registered by Section 10.1 of RFC 7519

(2) public claim names: user/application defined claims and available for public (3) private claim names: names defined by a producer and consumer FIG. 5B is a table 510 that lists the minimal contents of a JWT payload under an embodiment. As shown in table 510, the payload comprises at least the intended recipients of the token (aud), the expiration time of the token (exp), the first and last names of the user (first_name, last_name), the issuance time of the token (iat), the principal that issued the token (iss), the time before which the token cannot be accepted (nbf), the roles that the subject has been granted (roles), the principal that is the subject of the token (sub), the directory tenant that issued the token (tid), and the payload version (ver).

An example payload can be expressed as follows:
{
"aud": "https://myapi.com/myaud/",
"iss": "https://myapi.com/",
"iat": 1416968588,
"nbf": 1416968588,
"exp": 1416972488,
"ver": "1.0",
"tid": "af411334-09af-49c2-b0c3-653adc1f376e",
"roles": [
  "Backup Operator",
  "Report Auditor"
],
"sub": "Jon.Dell@mycompany,com",
"first_name": "Jon",
"last_name": "Dell"

The header 404 and payload 406 are digitally signed using the algorithm/key specified in the header. The JWT signature 408 is used to validate the authenticity of the token so that it can be trusted by the consumer. It also ensures the token has not changed in transition. The signature is a digital signature from both the header and the payload. The header and payload are JSON objects that are Base64 encoded for transport. It should be noted that the tables of FIGS. 5A and 5B provide an example of a JWT header and payload and other elements and definitions are also possible.

The following example shows pseudo code which needs to be applied to use RSA PKCS #1 signature with SHA-256:
RS256 (
base64UrlEncode (Header)+"."+base64UrlEncode (Payload),
Secret)

The secret is kept by both the producer and consumer. In this way, only the producer and consumer may decode and validate the token.

An example token is given below. In this example, no real data is actually encoded, it is provided just for illustration purposes:
ABerF.DGUG3454FOKEffsHWKHF.fffbgn289756JHF-LHKF With respect to JWT Security, all of the security issues that are pertinent to any cryptographic application must be addressed by JWT/JWS/JWE/JWK agents. For example, JSON Web Encryption (JWE) is described by RFC 7516.

In general, the contents of a JWT cannot be relied upon in a trust decision unless its contents have been cryptographically secured and bound to the context necessary for the trust decision. In particular, the key or keys used to sign and/or encrypt the JWT will typically need to verifiably be under the control of the party identified as the issuer of the JWT.

While syntactically the signing and encryption operations for nested JWTs may be applied in any order, if both signing and encryption are necessary, normally producers should sign the message and then encrypt the result (thus encrypting the signature). This prevents attacks in which the signature is stripped, leaving just an encrypted message, as well as providing privacy for the signer. Furthermore, signatures over encrypted text are not considered valid in many jurisdictions.

A JWT may contain privacy-sensitive information. When this is the case, measures should be taken to prevent disclosure of this information to unintended parties. One way to achieve this is to use an encrypted JWT and authenticate the recipient. Another way is to ensure that JWTs containing unencrypted privacy-sensitive information are only transmitted using protocols utilizing encryption that support endpoint authentication, such as Transport Layer Security (TLS).

Figure 6:
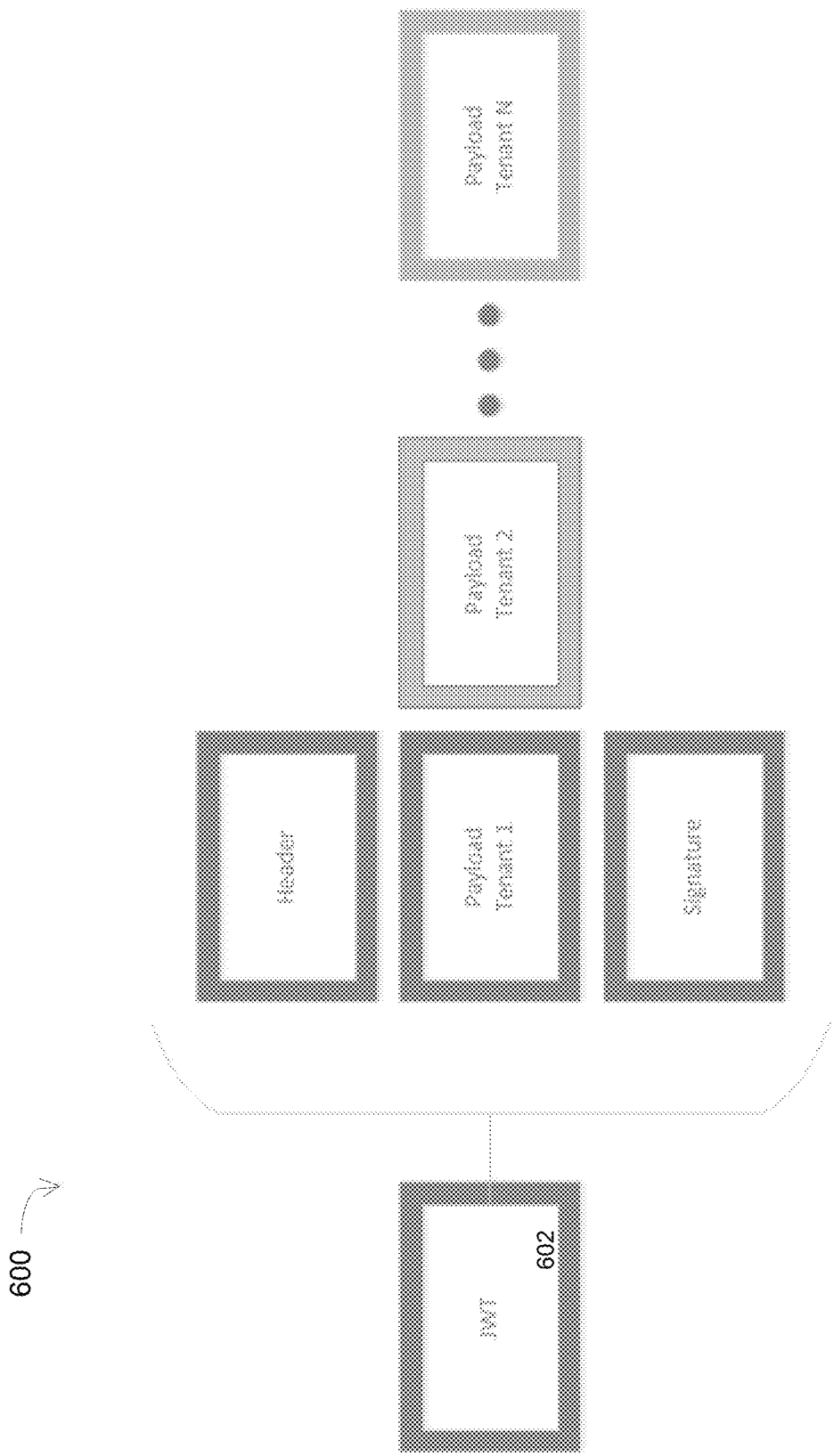
FIG. 6 is a diagram 600 that illustrates a JWT logical representation for the case when a principal has roles assigned in different tenants.

With respect to using JWT tokens in multi-tenant environment, such as shown in FIG. 2, in multi-tenant environment 100, a principal may have an access to different tenants. Upon successful authentication with the AAS, a principal receives a JWT token. This token can be passed to different software components servings same or different tenants. Software components may need to extract some principal details from the token. However, an unauthorized access must be prohibited. To achieve this, the following technique is used in an embodiment: the JWT token can have N payloads, one for each tenant where principal has any roles. Each payload is encrypted with a certain key that belongs to the target component/tenant to guarantee that only authorized component/tenant may decrypt and access payload details. FIG. 6 is a diagram 600 that illustrates a JWT logical representation for the case when a principal has roles assigned in different tenants. As shown in diagram 600, the JWT 602 comprises a header and signature, with payloads for each of N tenants, denoted payload tenant 1 to payload tenant N.

Figure 7:
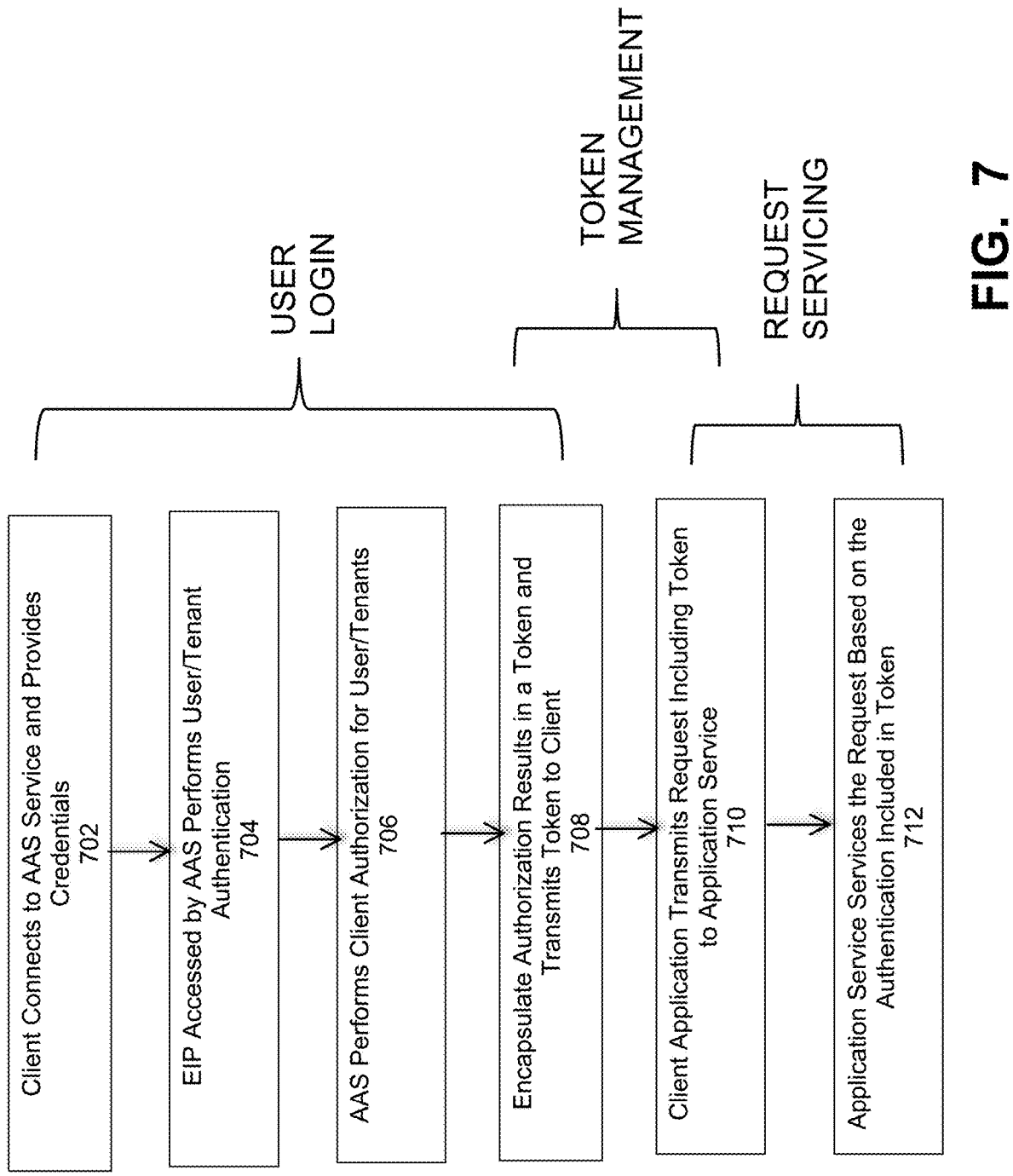
FIG. 7 is a flowchart that illustrates a method of providing a stateless authentication and authorization process for distributed networks under some embodiments.

FIG. 7 is a flowchart that illustrates an overall method of providing a stateless authentication and authorization process for distributed networks under some embodiments. As shown in FIG. 7, the method begins with the client user connecting to an authentication and authorization service (AAS) by providing his or her user credentials, 702. The AAS accesses an external identity provider (EIP), which performs the user or tenant authentication using appropriate database lookups and/or validation methods, 704. The EIP return the authorization results to the AAS, and upon authorization by the EIP, the AAS performs client authorization for the users/tenants, 706. In step 708, the AAS encapsulates the authorization results from step 706 into a token, such as a JWT, and transmits the token to the client. This essentially completes the user login procedure in response to the request and credentials by the user provided in step 702.

After receiving the token from the AAS, the client application, through a component service, transmits a request including the token to the application service, 710. The application service then services the request based on the authentication information contained in the token 712, and the result is then returned to the client. These process steps fulfill the application or data access request portion of the process. The use of a token management process to encode the token with authentication results and transmit the token between the AAS, client and application service provides a built-in mechanism that eliminates the need for the application service to access the AAS during the request servicing phase. This greatly reduces the communications overhead in the process by eliminating the I/O calls to the AAS typically needed during the application service portion of the overall client request session.

Figure 8:
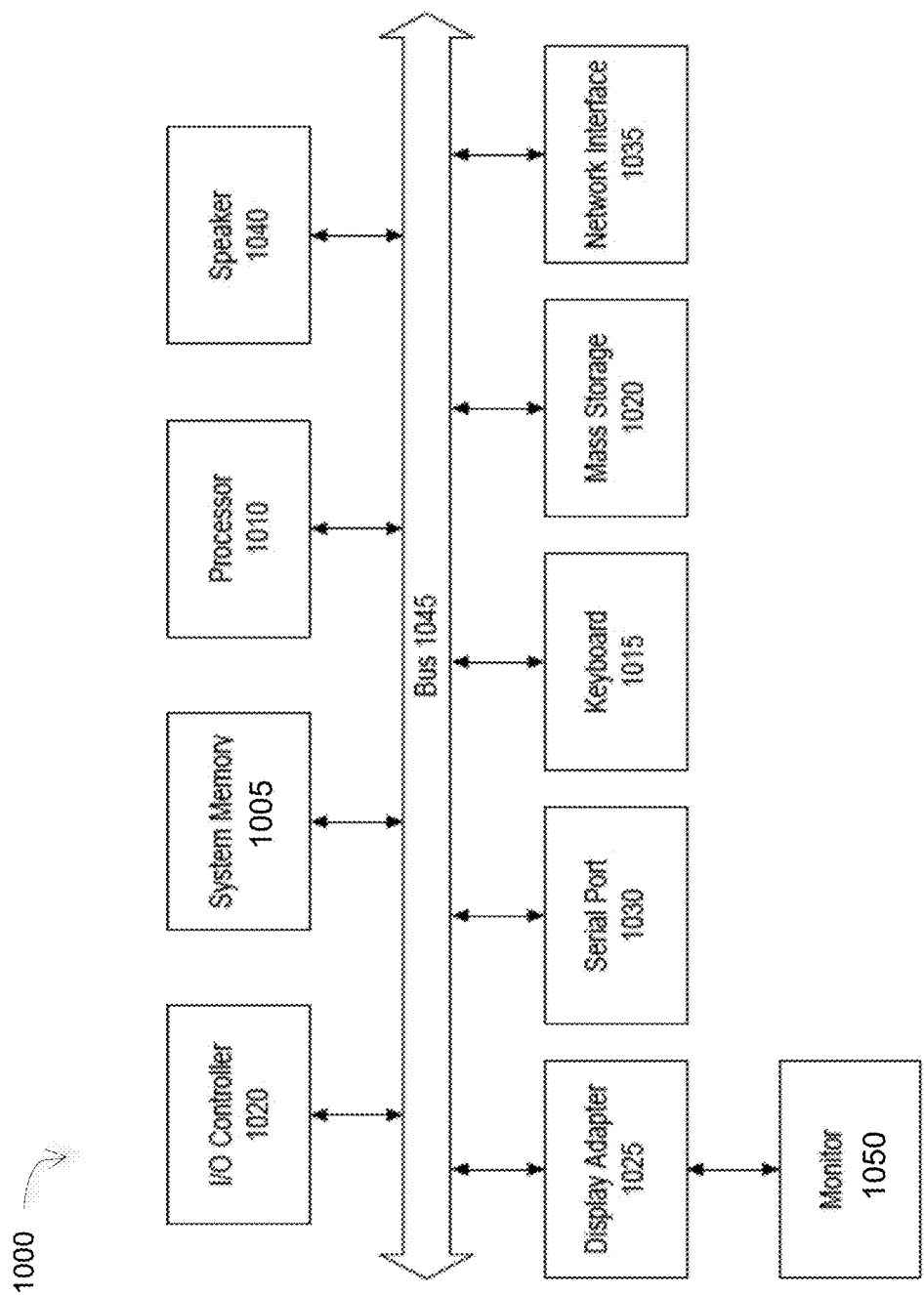
FIG. 8 shows a system block diagram of a computer system used to execute one or more software components of the system of FIG. 2 under some embodiments.

The network environment of FIG. 2 may comprise any number of individual client-server networks coupled over the Internet or similar large-scale network or portion thereof. Each node in the network(s) comprises a computing device capable of executing software code to perform the processing steps described herein. FIG. 8 shows a system block diagram of a computer system used to execute one or more software components of the present system described herein. The computer system 1005 includes a monitor 1050, keyboard 1015, and mass storage devices 1020. Computer system 1000 further includes subsystems such as central processor 1010, system memory 1005, input/output (I/O) controller 1020, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 8 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, Internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct Internet upgrade patching mechanism or through an applications store (e.g., Apple iTunes and App store, Google Play store, and Windows Phone App store).

The system can run in platform-independent, non-native applications. For example, client can access the system through a web application from one or more servers using a network connection with the server or servers and load the web application in a web browser. For example, a web application can be downloaded from an application server over the Internet by a web browser. Non-native applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of performing stateless authentication and authorization in a distributed computer network having multiple tenants, comprising:
   receiving, in an authentication and authorization service (AAS) component, a user request from each of a plurality of users to network clients from a client user for data access served by an application, wherein the request comprises respective user credentials;
   providing each of the user credentials to an identity authenticator;
   performing, in the AAS component, client authorization for each user validated by the identity authenticator;
   encapsulating a lightweight data structure token with the client authorization by appending to a token header a plurality of payloads of one payload for each user, wherein a payload comprises a user name, a recipient identifier, token issuance and expiration times, and access rights for each respective user corresponding to the respective user credentials;
   digitally signing the token header and plurality of payloads using a corresponding key specified in the header for each payload to form an encrypted token; and
   transmitting the encrypted token to an application service that applies Role Based Access Control (RBAC) rules to the client authorization encapsulated in the token to decide whether to service or deny the user request from each of the plurality of users based on the access rights for each respective user encoded in the encrypted token.

2. The method of claim 1 wherein the token comprises a lightweight JavaScript Object Notation (JSON) token in the form of a JSON web token (JWT).

3. The method of claim 2 wherein the JWT carries statements that are sets of claims made by one entity about another entity in the computer network.

4. The method of claim 3 wherein the encrypted token is encoded as a JavaScript Object Notation (JSON) object.

5. The method of claim 4 wherein each payload comprises at least one of three classes of JWT claim names including registered claim names, public claim names, and private claim names.

6. The method of claim 5 wherein the digitally signing creates a signature that is used to validate the authenticity of the token.

7. The method of claim 1 wherein the user credentials comprise user name and password, and wherein the identity authenticator is an external identity provider having access to a user identity database listing users and corresponding credentials.

8. The method of claim 3 wherein the network comprises a cloud computing network, and wherein each of the user and other users comprises a user tenant in the distributed computer network, and wherein the application service is individually configured for each tenant to apply RBAC rules individually for each tenant.

9. The method of claim 8 wherein a principal receiving the encrypted token has access to each tenant and passes it to software components serving at least some of the tenants.

10. The method of claim 9 wherein each tenant has a different role defined by the RBAC, and wherein rules and policies defined in the RBAC are applied during the client authorization.

11. The method of claim 10 wherein the distributed computer network comprises a database management system, and the user request comprises a query to data stored by one or more data sources in the distributed computer network.

12. A system having a stateless authentication and authorization service (AAS) in a distributed computer network having multiple tenants, comprising:
- an AAS hardware component receiving a user request from each of a plurality of users to network clients from a client user for data access served by an application, wherein the request comprises respective user credentials transmitted to an external identity provider (EIP) for verification of each user, the AAS component further performing client authorization for each user verified by the DR and encapsulating a lightweight data structure token with the client authorization by appending to a token header a plurality of payloads of one payload for each user, wherein a payload comprises a user name, a recipient identifier, token issuance and expiration times, and access rights for each respective user corresponding to the respective user credentials, and digitally signing the token header and plurality of payloads using a corresponding key specified in the header for each payload to form an encrypted token, and
- an interface of the AAS component transmitting the encrypted token to an application service that applies Role Based Access Control (RBAC) rules to the client authorization encapsulated in the token to decide whether to service or deny the user request from each of the plurality of users based on the access rights for each respective user encoded in the encrypted token.

13. The system of claim 12 wherein the token comprises a lightweight JavaScript Object Notation (JSON) token in the form of a BON web token (JWT), the JWT carrying statements that are sets of claims made by one entity about another entity in the computer network.

14. The system of claim 13 wherein the encrypted token is encoded as a JavaScript Object Notation (JSON) object.

15. The system of claim 14 wherein the user credentials comprise user name and password, and wherein the EIP is a third party having access to a user identity database listing users and corresponding credentials.

16. The system of claim 15 wherein the network comprises a cloud computing network, and wherein each of the users comprises a user tenant in the system, and wherein the application service is individually configured for each tenant to apply RBAC rules individually for each tenant.

17. The system of claim 16 wherein a principal receiving the encrypted token has access to each tenant and passes it to software components serving at least some of the tenants.

18. The system of claim 17 wherein each tenant has a different role defined by the RBAC, and wherein rules and policies defined in the RBAC are applied by the authorization unit of the AAS.

19. The system of claim 18 wherein system comprises a database management system, and the user request comprises a query to data stored by one or more data sources in the system.

20. A computer program product, comprising a non-transitory computer-readable medium having a computer-readable program code embodied therein, the computer-readable program code adapted to be executed by one or more processors to perform stateless authentication and authorization in a distributed computer network having multiple tenants, the non-transitory computer readable medium when executed by the one or more processors implementing a method comprising:
- receiving, in an authentication and authorization service (AAS) hardware component, a user request from each of a plurality of users to network clients from a client user for data access served by an application, wherein the request comprises respective user credentials;
- providing each of the user credentials to an identity authenticator;
- performing, in the AAS hardware component, client authorization for the user validated by the identity authenticator;
- encapsulating a lightweight data structure token with the client authorization by appending to a token header a plurality of payloads of one payload for each user, wherein a payload comprises a user name, a recipient identifier, token issuance and expiration times, and access rights for each respective user corresponding to the respective user credentials;
- digitally signing the token header and plurality of payloads using a corresponding key specified in the header for each payload to form an encrypted token; and transmitting the encrypted token to an application service that applies Role Based Access Control (RBAC) rules to the client authorization encapsulated in the token to decide whether to service or deny the user request from each of the plurality of users based on the access rights for each respective user encoded in the encrypted token.

\* \* \* \* \*